(12) United States Patent
Costa Neto et al.

(10) Patent No.: US 12,316,407 B2
(45) Date of Patent: May 27, 2025

(54) METHOD FOR ADAPTIVE BEAM SWEEPING

(71) Applicant: SAMSUNG ELETRÔNICA DA AMAZÔNIA LTDA., Amazônia (BR)

(72) Inventors: Francisco Hugo Costa Neto, Manaus (BR); Weskley Vinicius Fernandes Mauricio, Manaus (BR); Mario Oliveira Costa Dias, Manaus (BR); Thais Carvalho Areias, Manaus (BR)

(73) Assignee: SAMSUNG ELETRÔNICA DA AMAZÔNIA LTDA., Manaus (BR)

( * ) Notice: Subject to any disclaimer, the term of this patent is extended or adjusted under 35 U.S.C. 154(b) by 27 days.

(21) Appl. No.: 18/231,373

(22) Filed: Aug. 8, 2023

(65) Prior Publication Data
US 2025/0015842 A1    Jan. 9, 2025

(30) Foreign Application Priority Data
Jul. 4, 2023    (BR) .................. 10 2023 013395-9

(51) Int. Cl.
*H04B 7/0408* (2017.01)
*H04B 7/0413* (2017.01)

(52) U.S. Cl.
CPC ......... *H04B 7/0408* (2013.01); *H04B 7/0413* (2013.01)

(58) Field of Classification Search
CPC .... H04W 16/28; H04W 72/54; H04B 7/0639; H04B 7/0617; H04B 7/086; H04B 7/0456; H04B 7/06; G06N 3/092
See application file for complete search history.

(56) References Cited

U.S. PATENT DOCUMENTS 10,666,342 B1 * 5/2020 Landis ................. H04B 17/318
11,425,591 B1 * 8/2022 Maggi ................... H04B 7/088
(Continued)

FOREIGN PATENT DOCUMENTS

WO    WO 2021/112592 A1    6/2021
WO    WO-2022250380 A1 * 12/2022 ........... H04B 7/0452
(Continued)

OTHER PUBLICATIONS

Min Soo Sim et al., "Deep Learning Based mmWave Bean Selection for 5G NR/6G With Sub-6 GHz Channel Information: Algorithms and Prototype Validation" Speciali Selection On Artificial Intelligence For Physical_Layer Wireless Communications: IEEE Access; vol. 8; Mar. 24, 2020; pp. 51634-51646.

*Primary Examiner* — Sophia Vlahos

(57) ABSTRACT

The present invention incorporates reinforcement learning into a beam sweeping framework to select the appropriate set of beams to transmit reference signals in a predefined time interval for covering an angular region. More specifically, a network node starts a learning process to determine the most appropriate subset of beams from a large set of available beams (codebook) to communicate with an associated network node over a radio channel. The transmitter node acquires knowledge from its interaction with other nodes of the wireless network to perform beam sweeping with reduced signaling overhead and latency. More specifically, other advantages, the invention improves the beam management in higher carrier frequencies.

16 Claims, 19 Drawing Sheets
(15 of 19 Drawing Sheet(s) Filed in Color)

(56) References Cited

U.S. PATENT DOCUMENTS

| | | | | |
|---|---|---|---|---|
| 2018/0132252 A1* | 5/2018 | Islam | .................. | H04W 72/046 |
| 2020/0029383 A1* | 1/2020 | Venugopal | ............. | H04B 7/088 |
| 2022/0248246 A1* | 8/2022 | Berliner | ................ | H04L 5/0048 |
| 2022/0368393 A1* | 11/2022 | Lee | ....................... | H04B 7/0634 |

FOREIGN PATENT DOCUMENTS

| | | | | |
|---|---|---|---|---|
| WO | WO-2023280380 A1 * | 1/2023 | ............. | G06N 20/00 |
| WO | WO-2023148094 A1 * | 8/2023 | ........... | H04B 7/0695 |
| WO | WO-2024083319 A1 * | 4/2024 | | |

* cited by examiner

METHOD FOR ADAPTIVE BEAM SWEEPING

CROSS-REFERENCE TO RELATED APPLICATION(S)

This application is based on and claims priority under 35 U.S.C. § 119 to Brazilian Patent Application No. BR 10 2023 013395-9, filed on Jul. 4, 2023, in the Brazilian Intellectual Property Office, the disclosure of which is incorporated by reference herein in its entirety.

TECHNICAL FIELD

The present invention is related to the wireless communication technology field. More specifically, the invention concerns a method for the selection of beams to transmit reference signals in a predefined time interval using reinforcement learning techniques. It describes an adaptive learning framework to determine the most appropriate subset of beams from a large size set of beams to communicate over a radio channel with an associated node. The air interface of the fifth generation of mobile communications has a beam-centric design. That is, the channels and signals can be beamformed for data transmission and control-plane features.

In this sense fifth generation mobile communications (5G) provides mechanisms to the transmitter and receiver network nodes to establish highly directional communication links and explore the benefits from the resulting beamforming gain. These mechanisms are known as beam management and englobe several control tasks. The current beam management framework relies on beam sweeping to determine the most suitable transmitter-receiver beam pairs in a given angular region. During beam sweeping, each transmitter node sequentially sends reference signals through beams from an entire codebook or from a subset of a codebook to perform quality measurements and use this information to the beam indication.

BACKGROUND

The 5G standard has been envisioned to expand the capabilities of wireless networks, consequently providing optimized support to several use cases and design requirements. In view of this, the operation at the millimeter wave (mmWave) frequency range and massive MIMO antenna arrays are important technical solutions able to support an expressive enhancement of the data traffic capacity, which is a recognizably relevant demand of 5G.

The exploration of wider bandwidths is an effective and straightforward method to provide the extremely high demands of data rate and traffic volume. However, the available bandwidth at lower frequencies is limited, and the spectrum shortage is an unavoidable issue. Consequently, the use of higher frequencies is envisioned because of the large amount of available spectrum. On one hand, long term evolution (LTE) advanced (Release 10) supports a maximum bandwidth of 100 MHZ, considering carrier aggregation, and is expected to operate below 6 GHz. On the other hand, 5G new radio (NR) is envisioned to support several channel bandwidths and operate licensed spectra from sub-1-GHz up to 52.6 GHZ, as specified in 3GPP Release 15. These carrier frequencies are divided within two possible ranges. The frequency range 1 (FR1) corresponds to the interval 0.41-7.125 GHZ and the frequency range 2 (FR2) is associated with the carrier frequencies between 24.25-52.6 GHz, which belongs to the mmWave spectrum. The maximum supported channel bandwidths in NR are 100 MHz in FR1 and 400 MHZ in FR2.

The strong attenuation observed in the mmWave propagation can be compensated by means of advanced multiantenna techniques, which is one of the motivating factors for the beam-centric design in NR. The very small wavelengths of mmWave signals combined with advances in low-power radio frequency (RF) circuits enable large numbers of miniaturized antenna elements to be placed in small dimensions. Massive MIMO systems consider the base station (BS) equipped with a number of antennas much larger than the number of active user equipment (UEs) per time-frequency resource. This arrangement smooths out the channel responses due to spatial diversity, and the effects of fast fading are significantly reduced.

Therefore, an appropriate beamforming scheme with a great number of antennas allows focusing the signal on a desired direction to overcome the unfavorable channel propagation conditions. The air interface of NR is beam-based, which means that the channels and signals can be beamformed for data transmission and control-plane features.

Therefore, 5G and the upcoming generations of mobile communications must provide mechanisms to the transmitter and receiver nodes to establish highly directional communication links and explore the benefits from the resulting beamforming gain. These mechanisms are known as beam management and involve several control tasks, like initial access.

Initial access explores physical (PHY) and medium access control (MAC) layer functions to control directional communications and establish precise alignment of the transmitter and receiver beams. Its main operations are beam sweeping, beam measurement, beam determination, and beam recovery.

Beam sweeping refers to the process where a network node, e.g., BS or user equipment (UE), covers a spatial area by sequentially transmitting reference signals through different analog beams according to a predetermined sequence. During beam sweeping, the network node sequentially uses beams from an entire codebook or from a subset of a codebook to find the most suitable transmitter-receiver beam pairs for the data and control channels.

Beam measurement is the evaluation of the quality of the signal received from beam sweeping. Different metrics can be used for this task, like reference signal received power (RSRP) and signal to interference plus noise ratio (SINR). Based on the measurement of the quality of reference signals, the beam determination indicates the selection of the most convenient beam pairs. The beam report must be scheduled to be transmitted on the physical uplink control channel (PUCCH) or the physical uplink shared channel (PUSCH). Moreover, beam recovery refers to the monitoring of the quality of the connected beams and the search of alternative candidate beam pairs if consecutive beam failure triggers have been detected.

Sixth generation (6G) mobile communications are envisioned to support the sub-THz spectrum range (from 95 GHz to 3 THz). Consequently, higher carrier frequencies will require narrower beams and more antenna elements, which represents a significant increase of the codebook size. Hence, the existing beam sweeping protocol based on the sequential transmission-reception of reference signals through beams from a codebook will be severely limited due to a large signaling overhead and higher latency. Therefore, the development of the beyond 5G mobile networks requires the redesign of the beam sweeping process to support higher frequency carriers and bandwidths.

The development of a new beam sweeping framework to support beyond 5G mobile communication networks requires more sophisticated tools. In this context, reinforcement learning emerges as a powerful source of mechanisms to empower networks with autonomous algorithms provided with adaptability and capability of taking advantage of experiences when making decisions.

In this sense, reinforcement learning is a machine learning paradigm to determine the most suitable actions to take in each scenario to maximize a reward function. The learning agent does not have examples of optimal actions, but it must instead discover by a trial-and-error process. At each decision time, the learning agent chooses an action available at a current state, while the system determines the reward function and a new state. The goal of this approach is to determine a policy to maximize the reward function by selecting the most proper action in each state.

In the reinforcement learning paradigm, action may affect not only the immediate reward but also the upcoming states and their subsequent related reward. Thus, trial and error search and delayed reward are important distinguishing features of reinforcement learning compared with supervised and unsupervised learning. Another challenge that arises in reinforcement learning is the trade-off between exploration and exploitation. Exploration is the learning process, i.e., the process of discovering new possible solutions and exploitation is the process of utilization of the acquired knowledge. That is, the learning agent must exploit what it has already experienced in order to obtain reward, but it also has to explore other actions in order to make better action selections in the following decisions. Neither exploration nor exploitation can be pursued exclusively without failing at the task.

The relationship between the agent and the environment can be modeled by using the concepts of action, reward, and state. The action is an adjustment parameter used by the agent to interact with the environment. The reward is a scalar function which indicates the immediate payoff from an action. The state is an optional signal value (or a set of values) that models the information that the agent has about the environment. Therefore, the interaction between the agent and the environment can be modeled as the transition from one state to another restricted to the set of all possible states. The transition is a consequence of an action chosen in a set of available actions and an associated reward.

The paper entitled "Deep Learning-Based mmWave Beam Selection for 5G NR/6G With Sub-6 GHZ Channel Information: Algorithms and Prototype Validation", by Sim, Min Soo et al, published in 2020, proposes a deep reinforcement learning scheme to simplify the beam access procedure in 5G standalone wireless communication networks. It explores a deep neural network to estimate the power delay profile (PDP) of a sub-6 GHZ channel and to predict the optimal beams. The PDP is considered as a fingerprint of the network node position and contains essential angular information in a cell specific manner. The simulation results indicate that the beam selection reduces the beam sweeping overhead despite the computational complexity and increment of signaling overhead. However, this paper does not design any reasonable criteria of choice of beams. Network parameters (e.g., throughput, signal quality, latency) are not considered in the strategy of beam selection. Moreover, the neural network is treated as a black box, which prevents from further performance improvement, especially when signal level quality is low. Finally, for the training-set generation, it is used the conventional exhaustive search-based beam sweeping, which represents a huge signaling overhead.

The patent document WO2021112592A1 entitled "Artificial Intelligence-based Beam Management Method in Wireless Communication System and Apparatus Therefor" published on Jun. 10, 2021, by LG Electronics INC., proposes a method of defining beamforming vectors in consideration of mobility of receiving device and forming a beam signature and a beam book. The authors propose a method of transmitting reference signals based on a beam signature and a beam book and perform the learning process of a neural network based on the CSI measured based on the reference signal. Therefore, the designed method comprises determining parameters related to beam management; receiving, from a terminal, a beam-related report calculated based on the reference signal; performing artificial neural network learning based on the beam-related report; and updating the parameters related to beam management on the basis of the neural network learning result. The parameters related to beam management include location information of the terminal and movement path information of the terminal (e.g., UE, vehicle). The beam-related report comprises at least on CQI, PMI or L1-RSRP. The location information of the terminal is represented by a zenith angle and an azimuth angle. However, this patent document fails to consider the choice of beams to transmit SSBs a design parameter of the proposed framework. That is, parameters related to the beam sweeping are not incorporated into the learning framework which controls the beam management. Moreover, the training of artificial networks based on angles of delivery and arrival requires channel information, which imposes huge signaling overhead.

SUMMARY

The present invention incorporates reinforcement learning into a beam sweeping framework to select the appropriate set of beams to transmit reference signals in a predefined time interval for covering an angular region. More specifically, a network node starts a learning process to determine the most appropriate subset of beams from a large set of available beams (codebook) to communicate with an associated network node over a radio channel. The transmitter node acquires knowledge from its interaction with other nodes of the wireless network to perform beam sweeping with reduced signaling overhead and latency. More specifically, the proposed invention improves the beam management in higher carrier frequencies. It provides more reliable, energy- and spectral-efficient massive multiple-input multiple-output (MIMO) communication systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objectives and advantages of the current invention will become clearer through the following detailed description of the example and non-limitative drawings presented at the end of this document.

DETAILED DESCRIPTION

Different beam sweeping solutions have been developed to support beam management in mmWave frequencies. In the current 5G standard, the most common beam sweeping approach is the exhaustive search. It operates a brute force approach that sequentially selects all beams from a predefined codebook. The network node scans the entire angular space by transmitting per each narrow beam generated by a large antenna array. Once the network node starts the process, it must send the reference signals through all directions. The received signal levels at each link transmitter-receiver must be measured and then the remaining operations of the beam management process should be executed.

Figure 1:
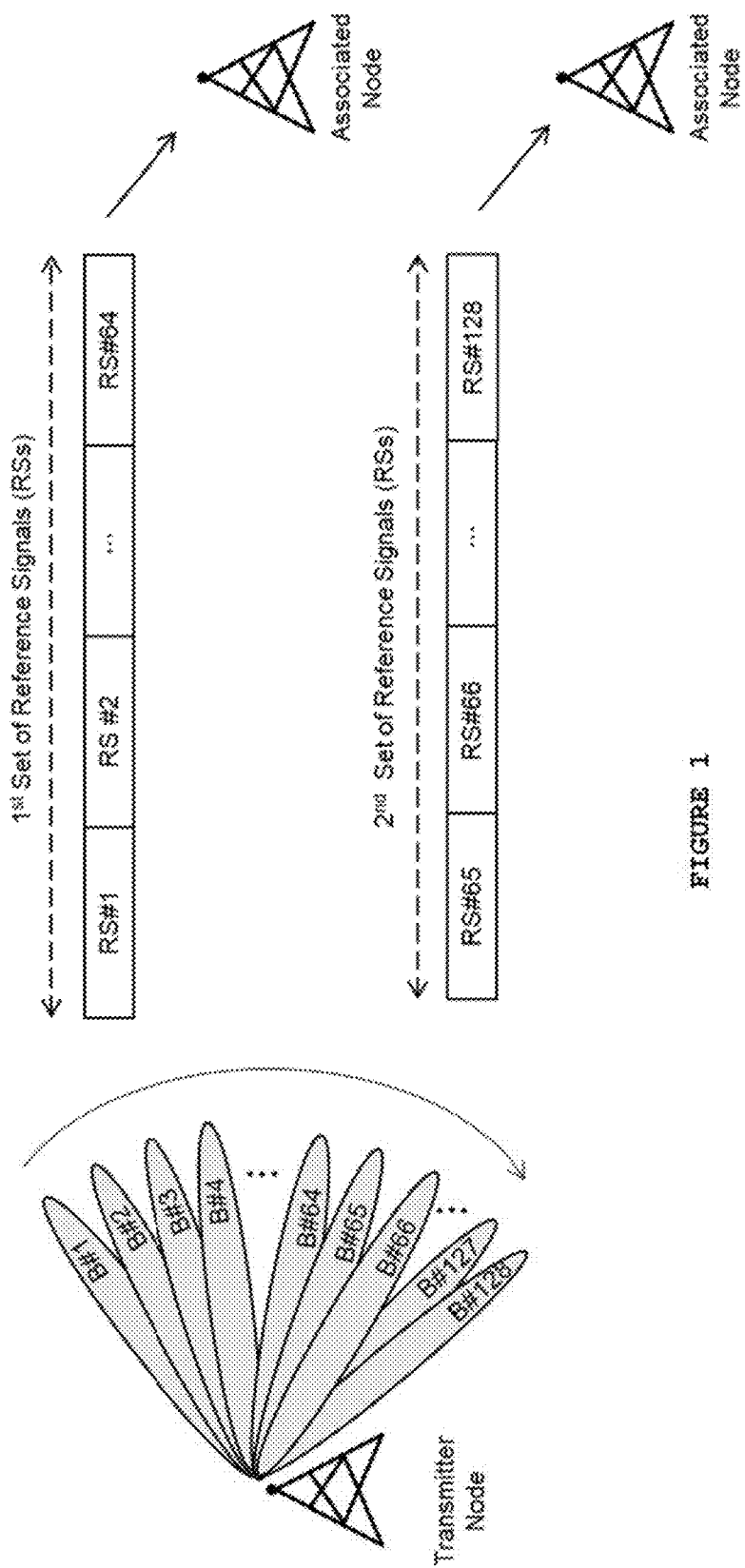
FIG. 1 presents a beam sweeping process based on exhaustive search of a system composed of 128 beams according to an embodiment of the present invention.

FIG. 1 provides a representation of beam sweeping based on exhaustive search of a system composed of 128 beams which supports the sending of 64 reference signals at a time. Besides exhaustive search, there are related methods like iterative and hierarchical search. Iterative Search operates a scanning of the angular space based on two operations. Initially, the network node conducts an exhaustive search through specific angular intervals. In this case, few antenna elements are used to generate wide beams. At the end of the first operation, it is determined the most appropriate angular interval. In the following, the network node activates more antenna elements to transmit at narrower beams. In this operation, it is also performed an exhaustive search, but in the most feasible angular interval determined previously.

Hierarchical Search performs an iterative search based on three operations. In the first operation, the transmitter node performs a sequential search with wide beams. Following the completion of the scanning cycle, a group of restricted beams is determined within the angular range of the best-detected beam, and a further search is performed employing a single narrow beam over specific directions opted from all beams. In the third phase, the search procedure is repeated until the highest signal is discovered using the narrowest available beam.

Figure 2:
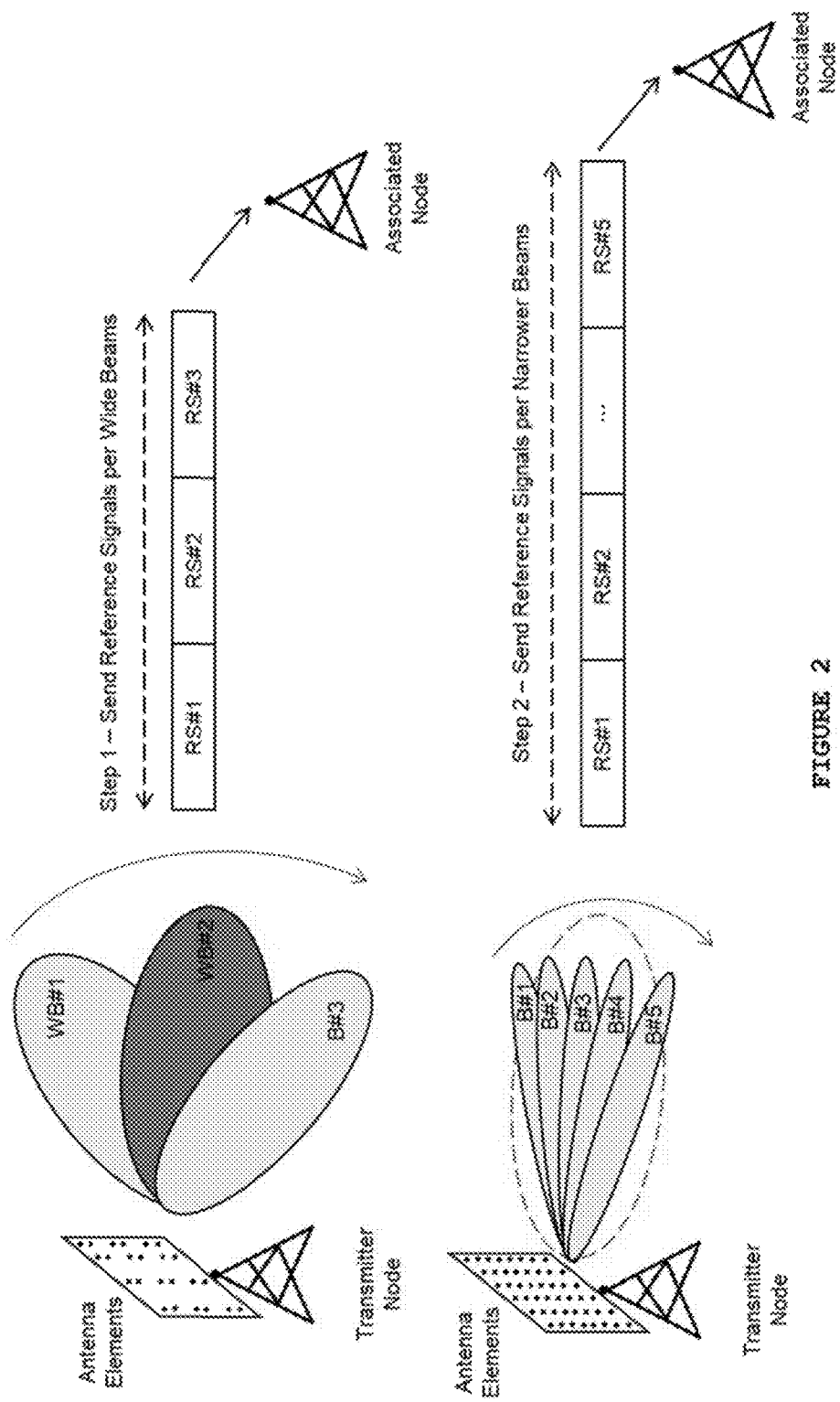
FIG. 2 represents a beam sweeping process based on iterative search according to an embodiment of the present invention.

FIG. 2 presents the representation of beam sweeping based on iterative search. Initially, the angular region is divided into three wide beams (WBs). A reference signal is sent per beam. After the selection of the most appropriate wide beam, reference signals are sent by narrower beams.

Figure 3:
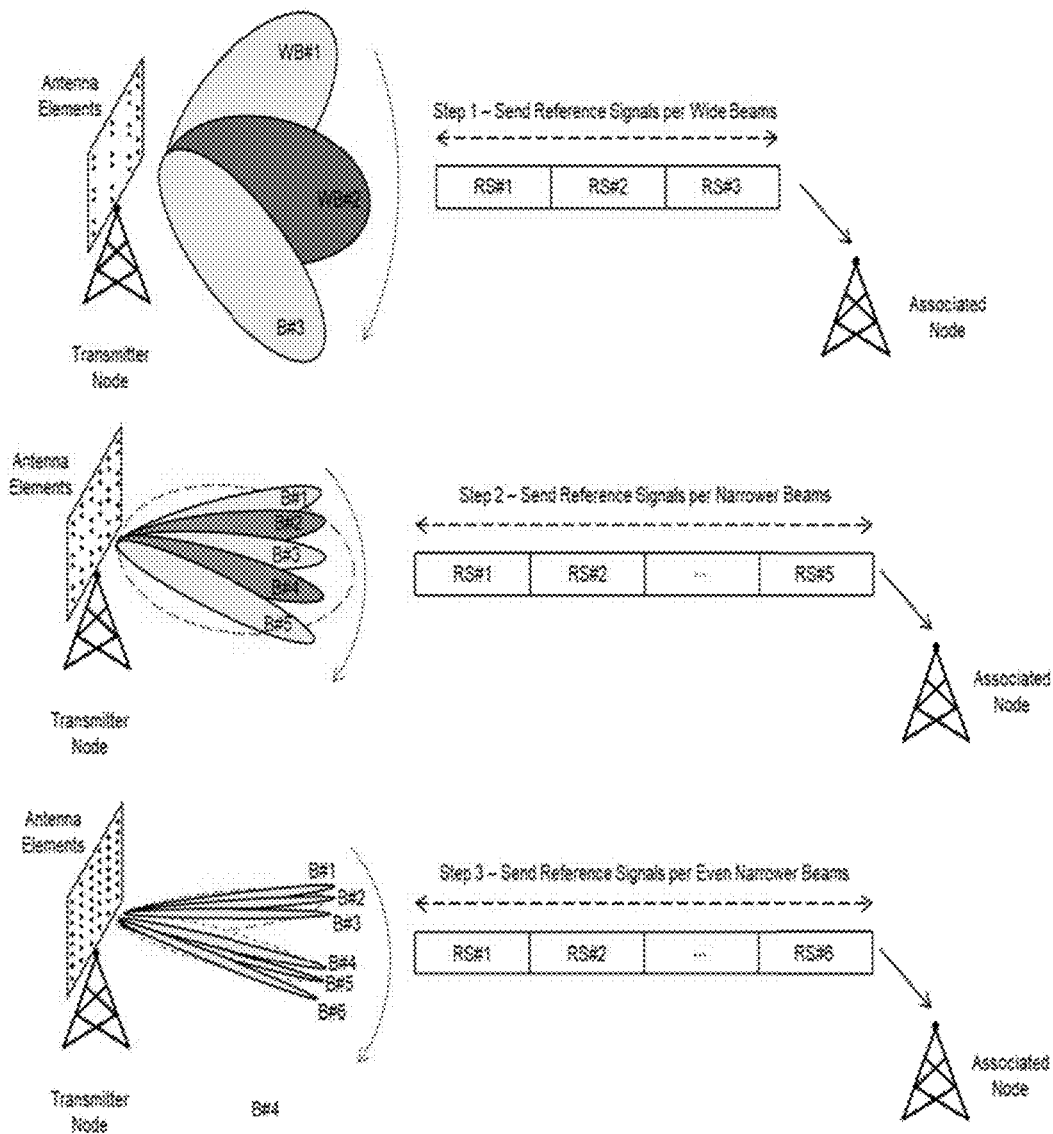
FIG. 3 represents a beam sweeping process based on hierarchical search according to an embodiment of the present invention.

FIG. 3 is the schematic representation of beam sweeping based on hierarchical search. The angular region is divided into smaller regions at every operation. The antenna elements are activated at each operation to provide narrower beams.

The method of the present invention relates to beam sweeping framework compliant with the signaling defined by the 3GPP standard, incorporating reinforcement learning into the process of covering a spatial area with reference signals transmitted/received through beams during a specified time interval. The method iteratively adjusts the set of selected beams based on a cost function and enables prompt reaction of a node endowed with intelligence to abrupt variations of the network. Moreover, the cost function can be designed to coordinate multiple goals of the network.

In summary, the method for adaptively selecting beams in a network node comprises:

determining a set of beams to transmit reference signals in a burst action set A={A #1, . . . , A #N}, where parameter N corresponds to the total number of reference signals;

transmitting a set of reference signals containing A to an associated node;

receiving the measurements of signal level sent by the associated node and calculating the associated reward (R) cost function, which comprises a set of associated weights W={W1, . . . , Wm};

updating the mapping the burst action set A with its associated reward (R) cost function; and retransmitting an updated burst action set A'.

The determination of the set of beams also comprises considering measurements of signal levels and quality indication. Additionally, the network node iteratively takes actions and measures their impacts on the radio link established with the associated node based on the signal level or quality indication of the link. The weights W are updated according to network goals. If a negative impact is identified in the network performance due to the decisions taken by the network node, triggering a fallback to a predefined mechanism.

In this scenario, a node endowed with intelligence as a network node, such as a base station (BS), unmanned aerial vehicle (UAV) or user equipment (UE), goes through a learning process to determine the adequate set of beams from large size codebooks to transmit reference signals to an associated node (e.g., UE, UAV) over a radio channel. Each node endowed with intelligence is modelled in the reinforcement learning (RL) framework as an agent, which is responsible for taking predefined actions based on its measurements.

Figure 4:
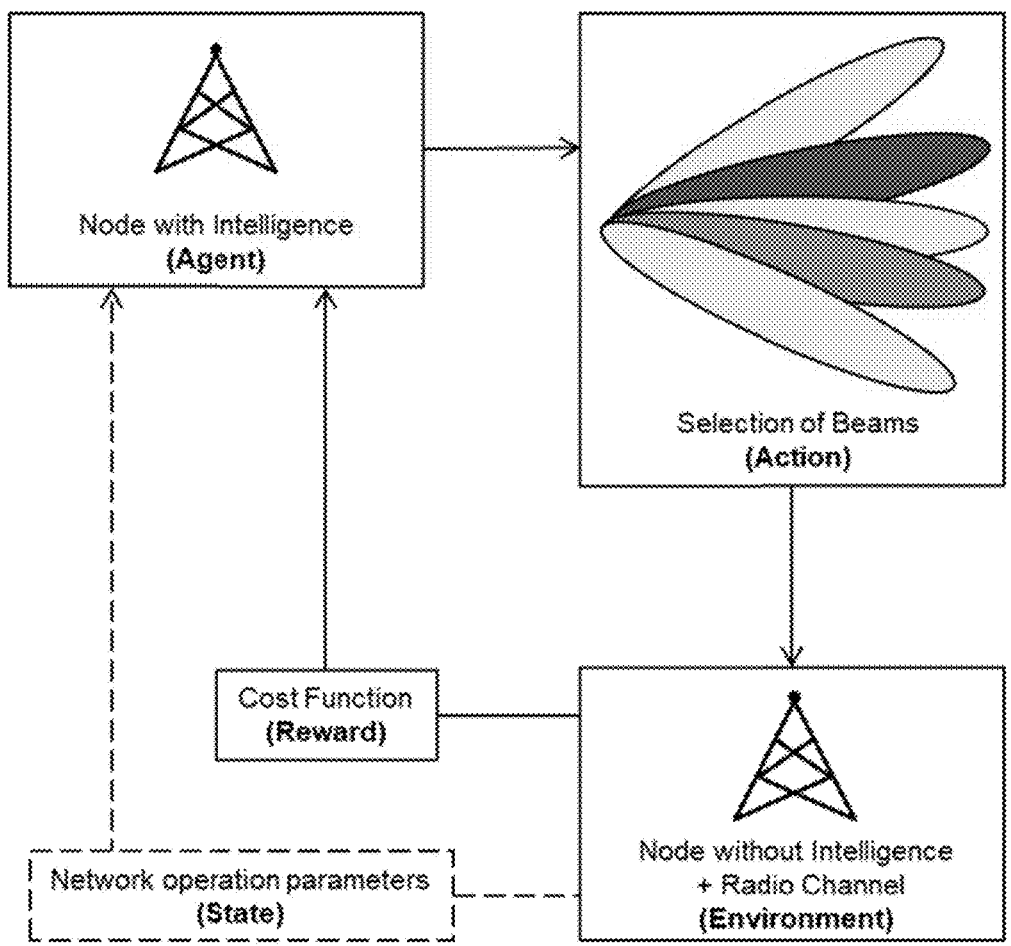
FIG. 4 presents an overview of the proposed beam sweeping framework based on reinforcement learning according to an embodiment of the present invention.

FIG. 4 depicts the proposed beam sweeping framework. The node endowed with intelligence, also called agent, determines the selection of beams (actions) to transmit signals to an associated node over the wireless radio channel (environment). After the actions are carried out, two types of information are reported back to the node with intelligence. The first type of information is called reward and is defined according to a specific cost function that the network wants to optimize. It quantifies the selected beams' quality according to the network's goals. The second type of information is called state, which indicates network parameters values after implementing the determined commands. The reward is always required, and the state is an optional feedback information that depends on the applied RL algorithm.

Figure 5:
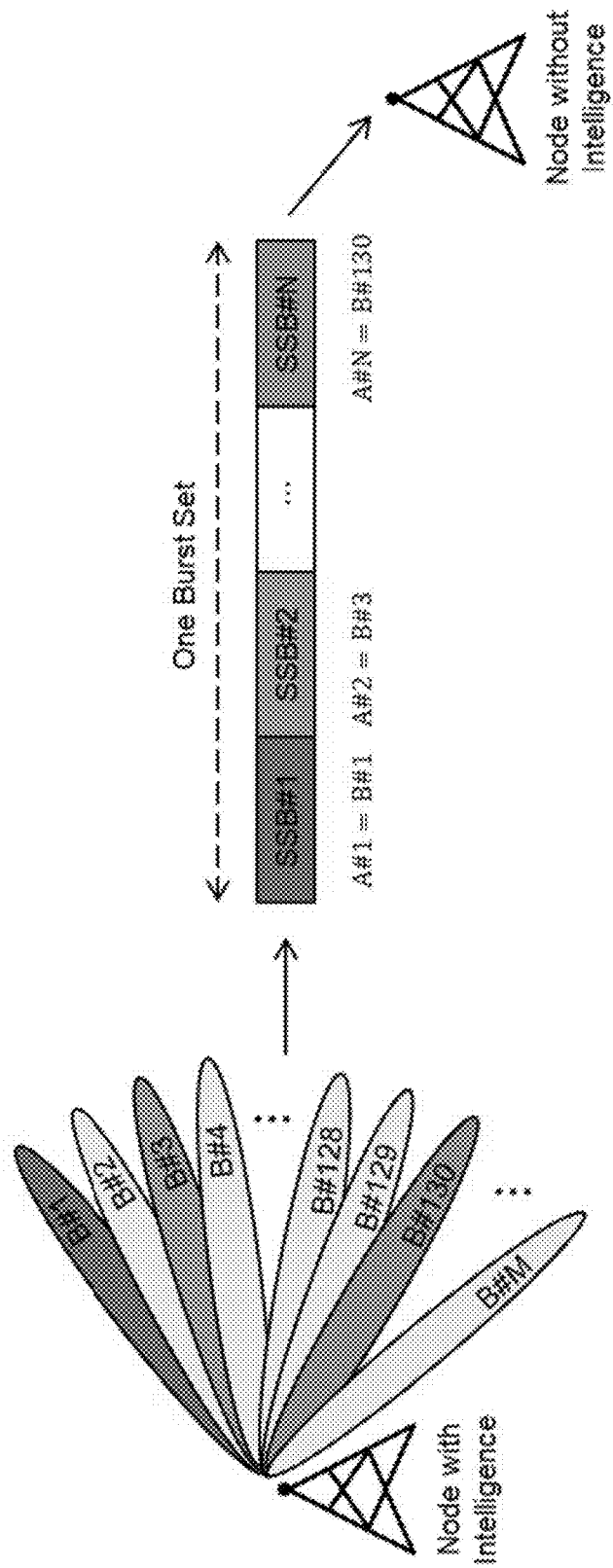
FIG. 5 shows a model of time multiplexed SSBs within a burst set period for a higher carrier frequency band according to an embodiment of the present invention.

Action (A) is defined as the determination of the set of beams to transmit the synchronization signal blocks (SSBs) in a burst set. Each selected beam is associated with a correspondent SSB. The action space is defined as the set A={A #1, . . . , A #N}, where parameter N corresponds to the total number of allowed SSBs. The n-th element of the set A represents the index of the beam selected to transmit at the n-th SSB and it is limited to a set of beams (B={B #1, B #2, . . . , B #M}) determined according to the angular region to be covered in the beam sweeping. The parameter M indicates the total number of available beams. The parameters N and M are predefined by the network. FIG. 5 illustrates the considered model of time multiplexed SSBs within one burst set period.

State(S) is defined as a measurement of signal level or quality indication of the link between the node endowed with intelligence and the associated node over a radio channel. In the proposed framework, the state is modeled as a discrete value and limited to minimum and maximum thresholds. These limits are defined according to network requirements. One example of state to the proposed framework is the reference signal received power (RSRP), a discrete value in dBm that is limited to a minimum and a maximum value with 1 dBm resolution, i.e., S={−144 dBm, . . . , −44 dBm}. Other example of state is the receive strength signal indicator (RSSI), a discrete value in dBm that is limited to a minimum and a maximum value with 1 dBm resolution, i.e., S={−100 dBm, . . . , −25 dBm}. Some RL algorithms do not rely on this feedback information to determine the policy of selection of beams. In these cases, the node with intelligence only considers the reward.

Reward (R) is defined as a cost function based on network performance indicators and/or goals of the network to quantify the effects of the selection of beams to transmit SSBs in a burst set. The first example of reward measures the impact of the correlation among beams and the quality of the link between the node endowed with intelligence and the associated node, such as:

$$R = W_1 \cdot F_{UNCORRELATION}(A) + W_2 \cdot F_{KPI}(A) \qquad (1)$$

where $W_1$ and $W_2$ are weight factors that determine the impact of the functions $F_{UNCORRELATION}$ and $F_{KPI}$, respectively.

$F_{UNCORRELATION}(A)$ measures the relationship among the set of selected beams determined by the burst action set A. It describes the uncorrelation among the set of selected beams A. That is, the greater the correlation between them, the greater the similarity. The selection of decorrelated beams, i.e., distinguishable beams, speed up the pace of the evaluation of the angular range, reducing the number of bursts to determine the most feasible set of beams. Thus, $F_{UNCORRELATION}$ has higher values for uncorrelated beams, such that:

$$F_{UNCORRELATION} = \frac{1}{F_{CORR}(A)} \qquad (2)$$

where $F_{CORR}$ represents the correlation among the selected beams. A set of beams is correlated if they are related in terms of one or more parameters, like geometry, distance, channel characteristics, etc.

$F_{KPI}(A)$ indicates the measurement of signal level or a quality indication of a radio channel between node with intelligence and the associated node. The radio channel is influenced by the set of selected beams determined by the action A. The channel quality of the link is crucial to the selection of appropriate beams. It can be written as $$F_{KPI}(A) = \frac{KPI(A)}{KPI_{TARGET}} \qquad (3)$$

where KPI is a channel quality indicator of the link between node with intelligence and associated node, e.g., RSSP, RSSI, RSRQ, SINR. $KPI_{TARGET}$ is a reference of quality indication of the link defined by the network according to the requirements of the provided services.

Reward represents a weighted average of the function of the correlation among beams ($F_{UNCORRELATION}$) and the function of the quality of radio link ($F_{KPI}$). This reward deals with the trade-off between the quick selection of beams and the assurance that the selected beams meet the operational requirements. The weight factors $W_1$ and $W_2$ are predefined by the network and sent in advance to the node with intelligence.

In an alternative example the reward also measures the impact of the correlation among beams and the quality of the link between the node endowed with intelligence and the associated node. In this sense, R can be written as:

$$R = W_3 \cdot F_{CORR}(A, B_1^{TARGET}) - W_4 \cdot F_{CORR}(A, B_2^{TARGET}) \qquad (4)$$

where $W_3$ and $W_4$ are weight factors that determine the impact of the function $F_{CORR}$ on the value of the reward function. $F_{CORR}$ calculates the correlation among the set of selected beams and a given beam B of interest. In this example, $B_1^{TARGET}$ indicates the beam with the average measurement of signal level or quality indication equal to target value $T_1$ and $B_2^{TARGET}$ indicates the beam with the average measurement of signal level or quality indication equal to target value $T_2$.

The term $W_3 \cdot F_{CORR}(A, B_1^{TARGET})$ benefits the selection of beams with signal levels or quality indication near to target value $T_1$ and the term $W_4 \cdot F_{CORR}(A, B_2^{TARGET})$ benefits the selection of beams which present signal levels or quality indication near to target value $T_2$. The weight factors $W_3$ and $W_4$ are predefined by the network and sent in advance to the node with intelligence.

Figure 6:
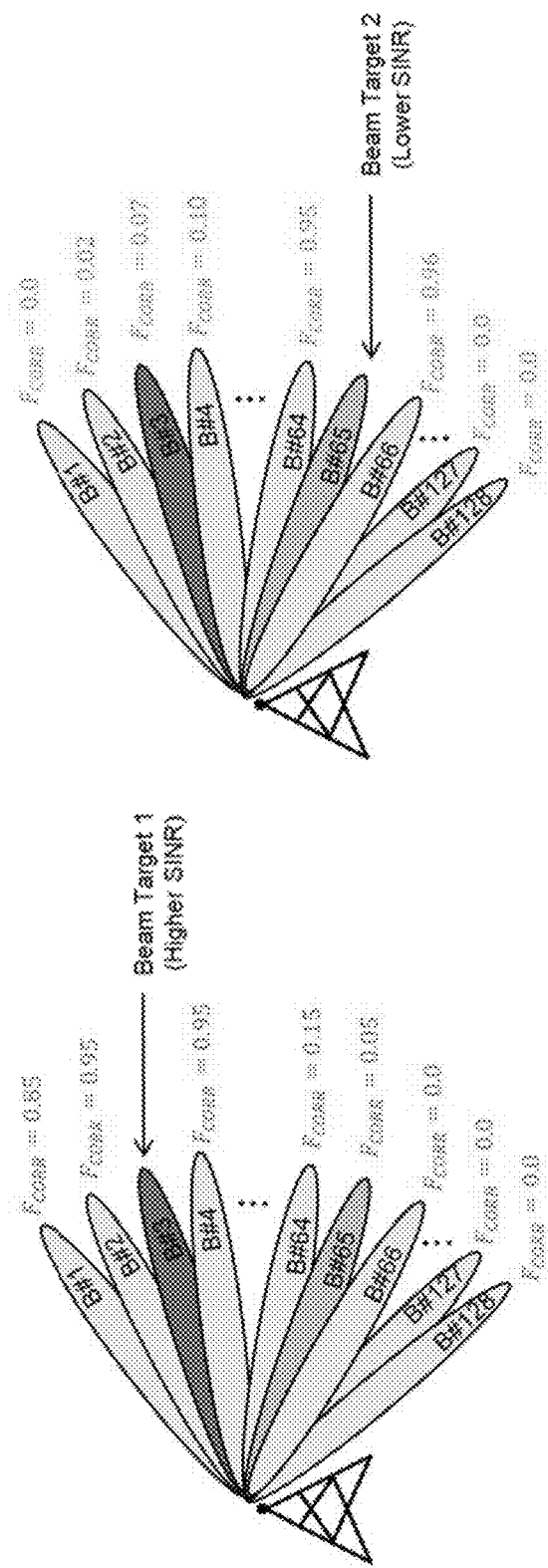
FIG. 6 presents the definition of subsets of beams according to the correlation to beams which presents a characteristic of interest according to an embodiment of the present invention.

FIG. 6 illustrates an example where the beam targets are B #3 and B #65. Each beam target has a different set of correlation in relation to the other beams of the system. That is, regions of the set of beams can be defined according to the desired features. The reward function ponders these values according to the selection objectives established by the network.

Therefore, the reward (R) can concentrate the selection of beams to regions which presents the target levels of quality, e.g., maximum and/or minimum values. In this case, it is possible to speed up the pace of selection of feasible beams with lower signal levels. This solution reduces the latency and assures the minimum level of signal quality.

Figure 7:
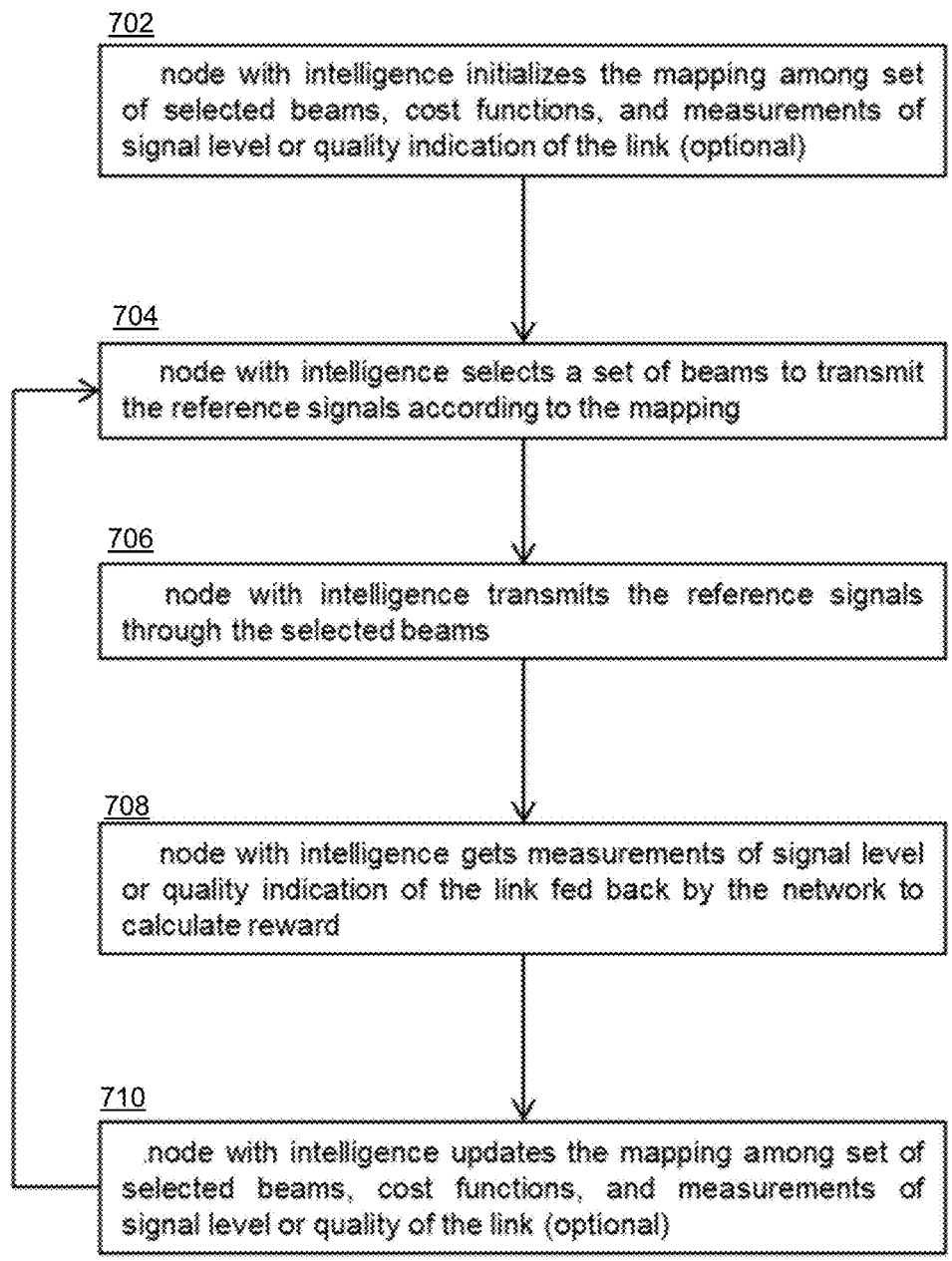
FIG. 7 depicts a flowchart according to an embodiment of the present invention for the beam sweeping framework based on reinforcement learning.

Given the configuration of the main elements of the proposed framework, the node with intelligence starts an iterative process of taking actions and calculating the associated reward. The interaction between the node with intelligence and the network is modeled according to the mapping between the taken actions, the associated reward, and optionally the states. Then, the most appropriate actions are determined based on this mapping. Once the mapping advances to a reasonable level of knowledge defined according to network goals, the agent exploits it to choose the most feasible set of beams. If any change in the scenario occurs, the mapping is updated, and another solution is provided. FIG. 7 presents the flowchart of the beam sweeping framework, wherein:

702—node with intelligence initializes the mapping between set of selected beams, values calculated of the cost functions, and measurements of signal level (optional). It can be used any prior-art mechanism to define the initial mapping values. The configuration parameters of the framework are defined according to network goals, e.g., the total number of allowed SSBs, total number of available beams, parameters of the cost function, and optionally which measurements of signal levels or quality indication should be considered;

704—the node with intelligence selects a set of beams to transmit the reference signals according to the mapping. These signals are transmitted through the set of selected beams in a burst set in operation 706;

708—the node with intelligence uses measurements of signal level sent by the network to calculate the reward with the action implemented in operation 704. Optionally, it also stores the state, i.e., the reported signal level measurements of the link established between the node with intelligence and the associated node;

710—the node with intelligence updates the mapping between set of selected beams, values calculated from cost functions, and measurements of signal level (optional). Then, based on the updated mapping, the node with intelligence determines the next action, i.e., the set of beams that will transmit SSBs in the next burst set, returning to 704.

In an example of application of the proposed embodiment, it is presented the use of contextual multiarmed bandits (CMAB), considering that the BS is the learning agent, responsible for reducing the number of SS bursts necessary to schedule given UE by scheduling beams into SSBs. Therefore, in order to utilize the CMAB, the reward is defined as the RSRP measured by the user equipment, the context information is defined as the Euclidian distance among the beams. This is an important information since for a given user equipment correlated beams' have similar RSRP, in the effect section a result is shown to prove this behavior. Note that the context information is used to obtain the beams' priority for being scheduled of the actions that were selected iteratively. The action value of an action is defined as the mean received reward when that action is selected. This way, the incremental average updating method is used to define the action value and is given as:

$$R = R + \frac{RSRP}{T} \quad (5)$$

where (R) is the reward, T is the number of times that the action (A) was selected. Note that, the learning agent selects the action that maximizes the trade-off between the beams' reward and their scheduling priorities.

In this example, the CMAB has two distinct phases of learning: exploration (with probability P) and exploitation (with probability 1−P). In the exploration phase, a random action is selected. An exploration phase is needed to get information about the unexplored actions or actions that have not yet been selected so often. In the exploitation phase, the learning agent selects the best action based on the mapping among action values and context information.

Figure 8:
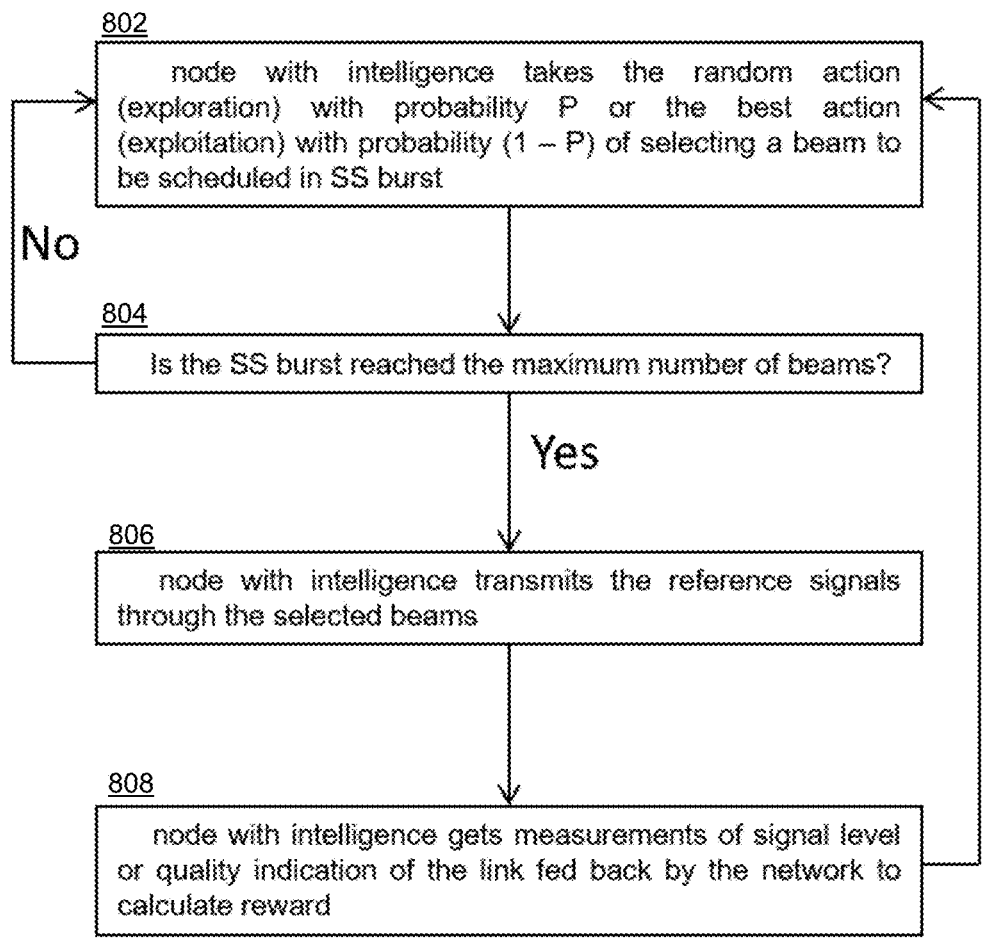
FIG. 8 depicts the flowchart of an example of application indicated at FIG. 7 with the use of contextual multi-armed bandits (CMAB) according to an embodiment of the present invention.

FIG. 8 details the operations of the example of application of the proposed embodiment as follows:

802—the node with intelligence takes an action based in the exploration or exploitation policy and selects the beam to be scheduled in the next SS burst.

804—checking if the maximum number of beams per SS burst is reached. If so, the signals are transmitted through the set of selected beams in a burst set. Otherwise, going back to 802.

806—the transmitter node sends the SS burst.

808—the node with intelligence uses measurements of signal level sent by the network to calculate the reward associated with the actions implemented in operation 802.

Figure 9:
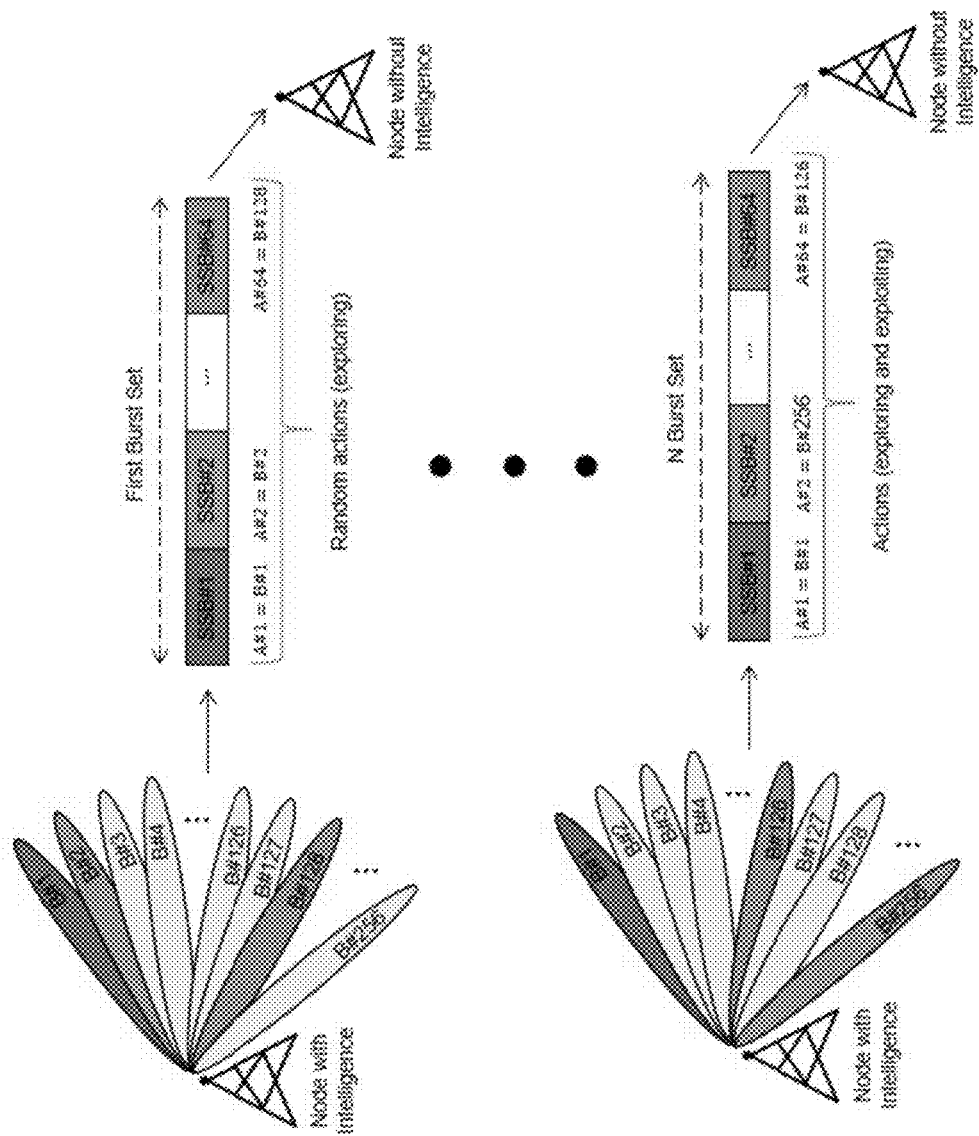
FIG. 9 presents an example of application using the CMAB according to an embodiment of the present invention.

FIG. 9 illustrates an example of the CMAB framework working for a scenario considering a base station configured with 256 beams with a SS burst containing 64 SSBs.

Initial SS bursts: Since the base station does not have any information about the environment in the initial SS bursts, it is expected that the base station perform explore more (random actions) the first SS bursts. To perform that, a method known as ε-greedy decaying method can be used. In this strategy the probability R of exploring or exploiting decays at each SS burst until it reaches the desired value. Other option is to consider any prior-art mechanism to get the initial information from the environment. In the example, the beam B #1 has the greatest action value, and it is selected in A #1.

SS bursts: After getting enough information of the environment the base station can start to perform the exploitation more often. Therefore, since there is no other beam scheduled to be transmitted in the SS burst yet, the action A #1 from the node with intelligence selects the action that maximizes only the action value (averaged RSRP). For the actions A #2 onwards, since there is already a beam scheduled in the SS burst, the Euclidian distance (context information) among beams is considered. Therefore, a combination of context information with actions values is used to select the next beam to be scheduled. In the example, the beam with greatest action value further away of the beam B #1 selected in A #1 is the beam B #256, which is the beam selected by the action A #2.

Figure 10:
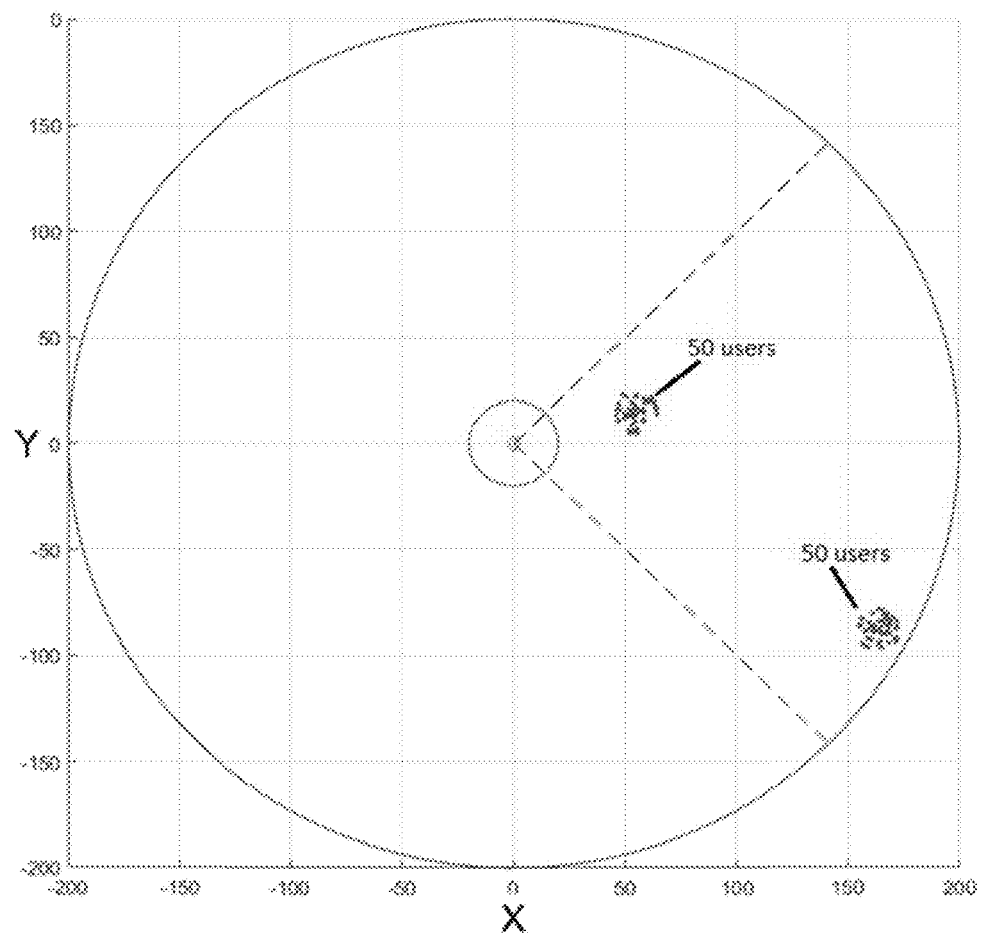
FIG. 10 presents a simulated scenario considering two hotspots of UEs according to an embodiment of the present invention.

A simulated scenario considering 2 hotspots of UEs is shown in FIG. 10, where a massive MIMO base station at coordinate (0, 0) is equipped with a Uniform-Rectangular Array (URA) (the number of antenna elements is M), where the x and y axis indicate the distances from the base station (BS) to the other elements of the scenario. The BS serves 100 user equipment (UEs), which are uniformly distributed inside two hotspots. Each one with a radius of 15 m, located inside a 120° cell sector with 200 m of radius. Furthermore, the BS is configured with a system carrier frequency of 52 GHz. This scenario provides the possibility for the base station to transmit many (at most M) beams. In this example, the BS is the node endowed with intelligence and the UE is the associated node.

Figure 11:
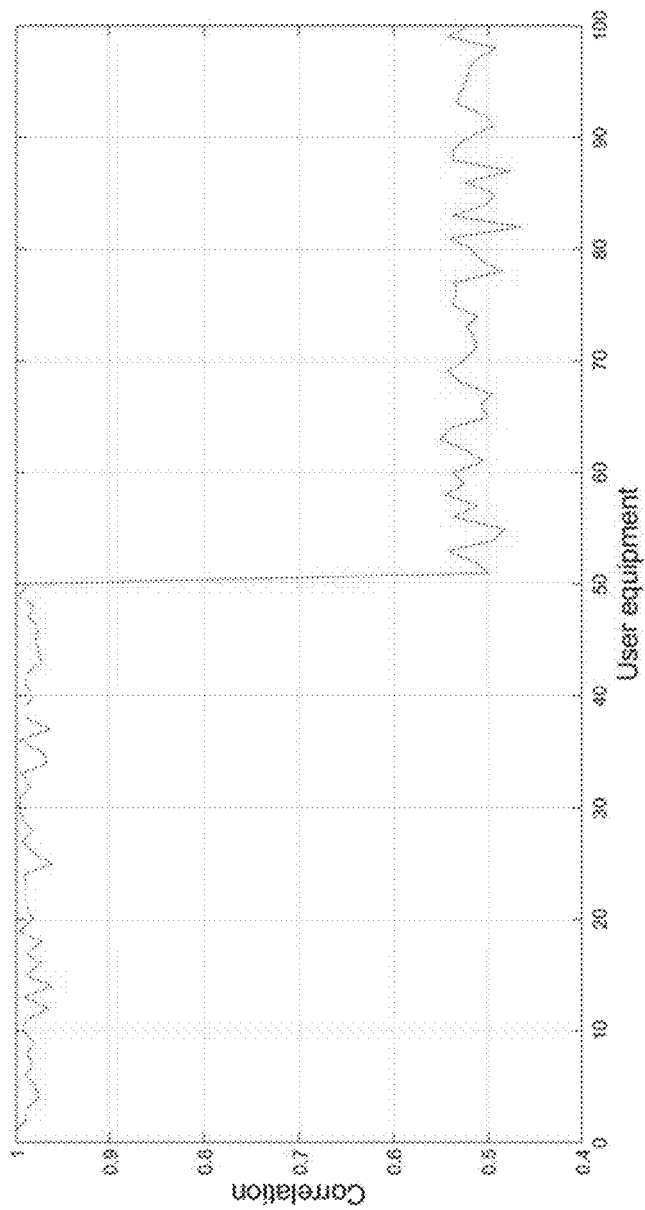
FIG. 11 presents the channel correlation for UEs from two distinct hotspots according to an embodiment of the present invention.

In FIG. 11, the channel correlation of a given beam transmitted to a user equipment in a hotspot in relation to all UEs is analyzed. The motivation for analyzing this scenario is to evaluate how similar the channel of the UEs is in relation to their geographical position. Also, in FIG. 11, the first 50 UEs belong to the same hotspot of the UE used as reference for calculation of the channel correlation and the last 50 UEs belong to the second hotspot. Then, the UE that belongs to the same hotspot of the reference UE has a high correlated channel, while the other has a low correlated channel. Therefore, a beam that would be used to serve a UE in a hotspot will fit any UE that belongs to that same hotspot. That is, the information obtained by using this beam to serve a given UE can be used to optimize which beams to send in the SS burst. For example, the network may begin to prioritize sending those beams that are being chosen most consistently for transmission and that have achieved the highest average RSRP to transmit first in a SS burst.

Figure 12:
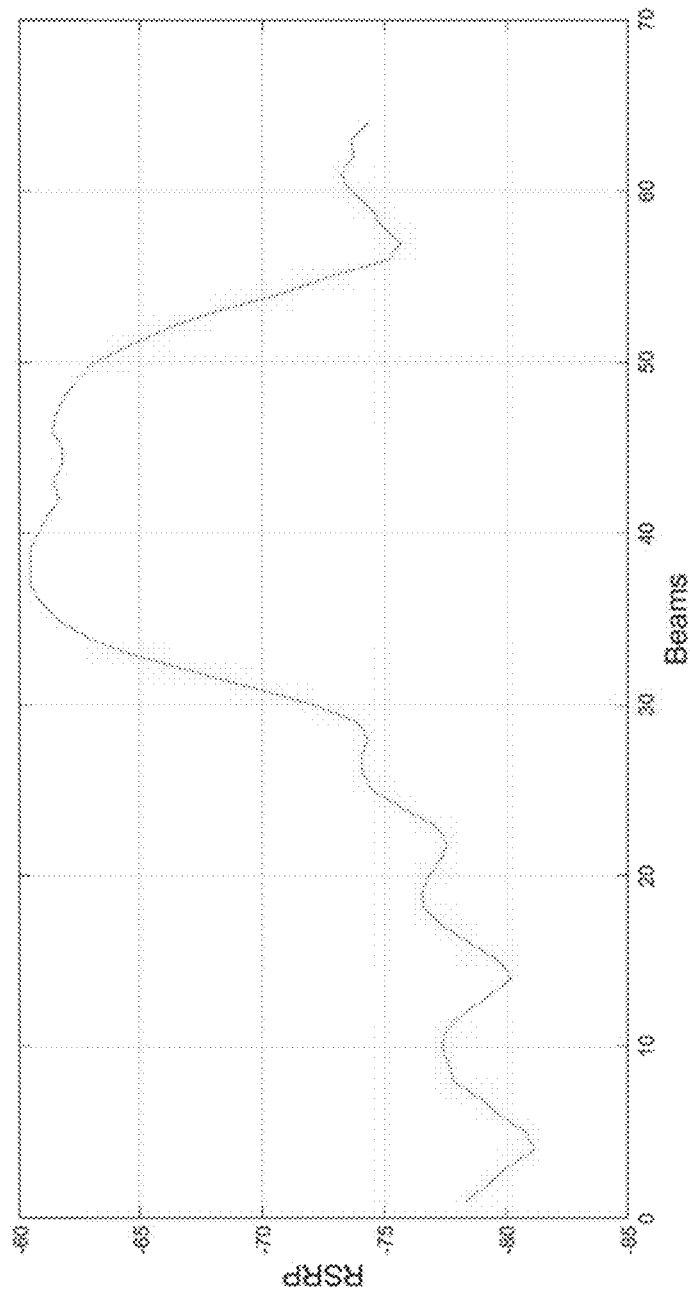
FIG. 12 presents the RSRP variation among 64 beams for a given user equipment according to an embodiment of the present invention.

In FIG. 12, the RSRP variation among the M=64 beams that are transmitted in one SS burst through the BS to a single UE configured with one antenna is analyzed. The RSRP smoothly changes as the beam's changes. Therefore, the more correlated the beams are, the more similar their RSRP will be for a given UE. In this sense, sending very correlated beams in the same SS burst can be avoided since they will have a similar RSRP. It is significant design factor to be considered since the number of beams sent in a SS burst is limited. This shows that the framework proposed herein identifies that the use of the information related to the correlation among beams allows the reduction of required burst sets.

The search space can be considered as the number of combinations of beams and SSBs that compose a SS burst. Therefore, the search space for selecting beams to transmit in a SS burst containing N SSBs, which is given in (5) as $$C(M, n) = \binom{M}{N} \quad (5)$$

Now, considering an example where the base station has M=256 beams and can transmit a SS burst with N=64 SSBs:

$$C(256, 64) = \frac{256!}{(64!(256-64)!)} = \frac{256!}{64!192!} = 1.90 \; e^{\wedge}91 \quad (6)$$

In this sense, the evaluation of all possible combinations is prohibitive. In the proposed solution, the search space is substantially decreased.

Figure 13:
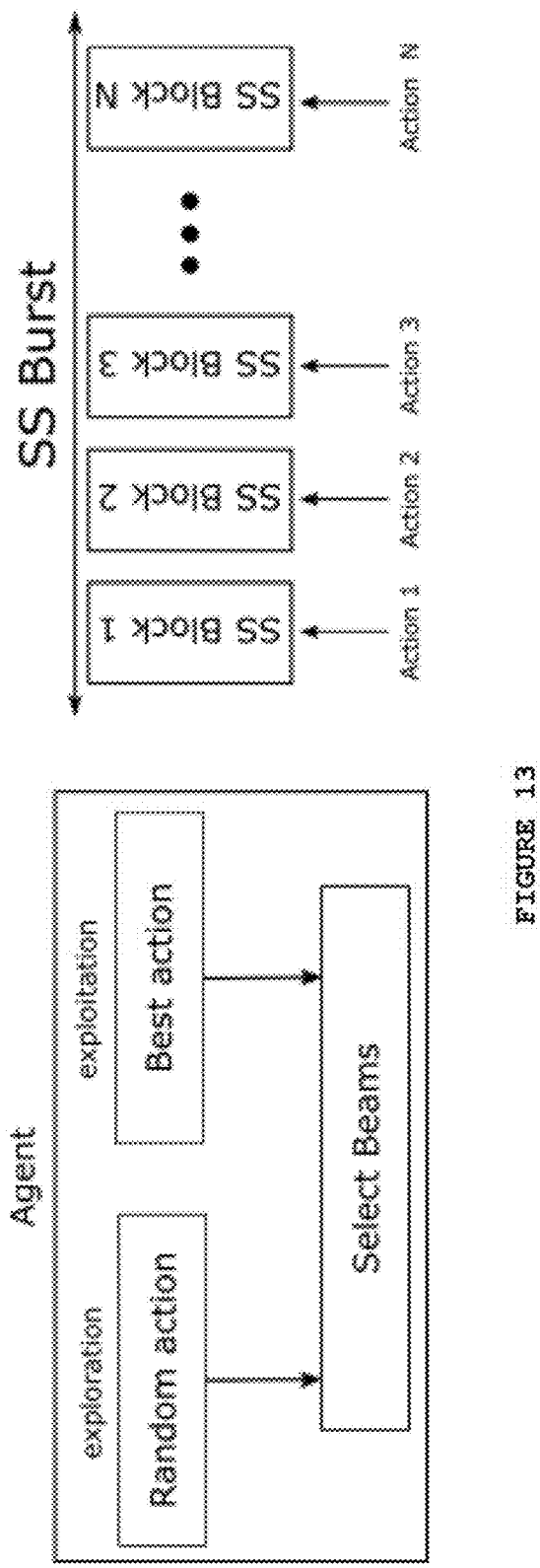
FIG. 13 illustrates an example of CMAB application according to an embodiment of the present invention.

FIG. 13 illustrates the same scenario along with the Contextual Multi-Armed Bandit (MAB) as the reinforcement learning algorithm. In this example, each action has a search space of 256 beams, wherein for 64 SSB the total number of possible combinations is reduced to 256× 64=16384. Therefore, the space of search is reduced from 1.90 e^91 to 16384.

Figure 14:
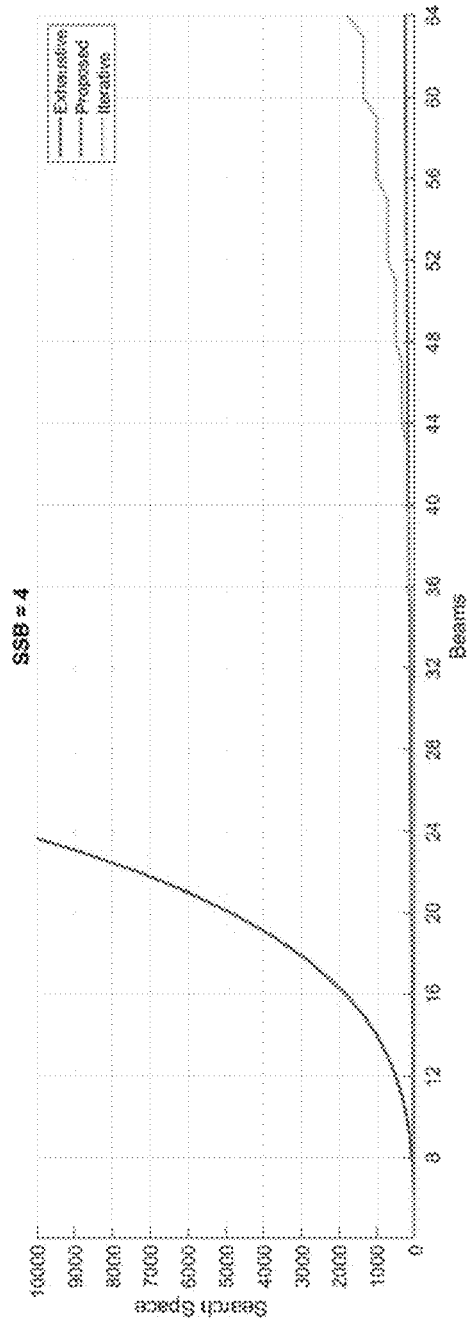
FIG. 14 presents the search space for different number of beams considering 4 SSBs according to an embodiment of the present invention.
Figure 15:
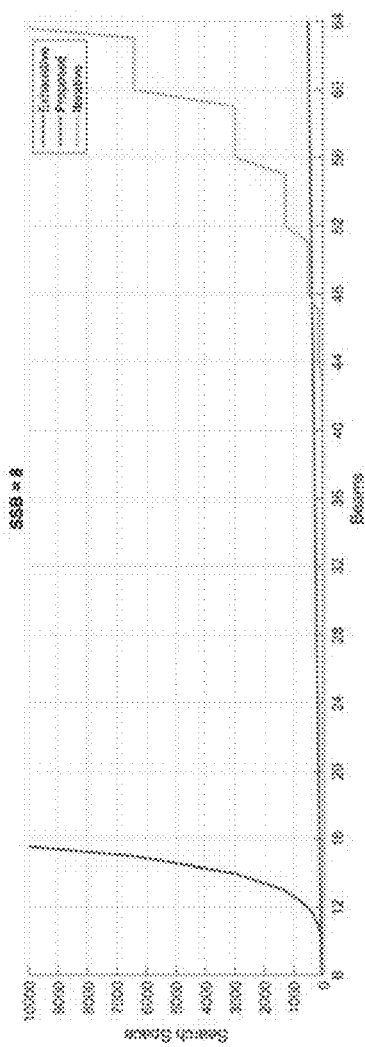
FIG. 15 presents the search space for different number of beams considering 8 SSBs according to an embodiment of the present invention.

FIGS. 14 and 15 present how the search space of the problem increases with the number of beams for the proposed solution (proposed), exhaustive search (exhaustive) and iterative search (iterative). As it can be seen, the search space of the exhaustive search increases exponentially with the number of beams, which makes this solution impractical as the number of beams increases. The proposed solution grows smoothly with the number of beams, and its search spaces are greater for a small number of beams in relation to iterative search. Moreover, the proposed solution has a very smaller search space in comparison with the other considered solutions.

In the following, it is evaluated a scenario composed of a BS and 100 UEs. Without loss of generality, it is considered that only one UE enters the system at a time, i.e., the BS tries to reach one UE at a time. The BS is the entity endowed with intelligence and uses CMAB approach. Equation (1) was chosen to be used as the action value of the CMAB framework with the stopping criteria of finding a beam with an RSRP of at least −70 dBm. The solutions considered for comparison are the exhaustive search and iterative search. The following scenario was considered:

M={64,128} beams and a burst set composed of N={4, 8} SSBs.

Figure 16:
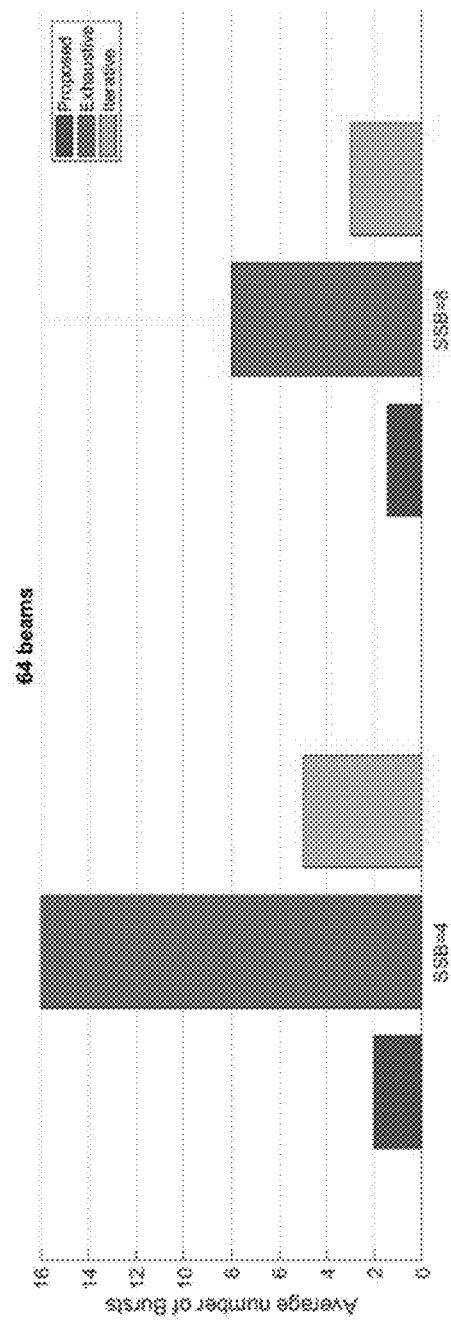
FIG. 16 presents the average number of SS bursts considering a BS with 64 beams using 4 and 8 SSB according to an embodiment of the present invention.

In FIG. 16, the CMAB framework (Proposed), the Exhaustive Search (Exhaustive), and the Iterative Search (Iterative) in terms of the number of SS bursts necessary to find the desired RSRP considering a BS equipped with M=64 beams with N={4, 8} SSBs to compose the SS burst. The motivation for analyzing this scenario is to evaluate the necessary number of ss bursts required to find a beam with a minimum given RSRP using the proposed solution. The UEs served by the BS configured with the proposed solution need in average 90% and 75% for exhaustive and iterative search less SS bursts to find a beam with the given RSRP considering N=4, respectively. It is also observed a reduction of 80% and 50% in comparison with exhaustive and iterative search with the given RSRP considering N=8, respectively.

Figure 17:
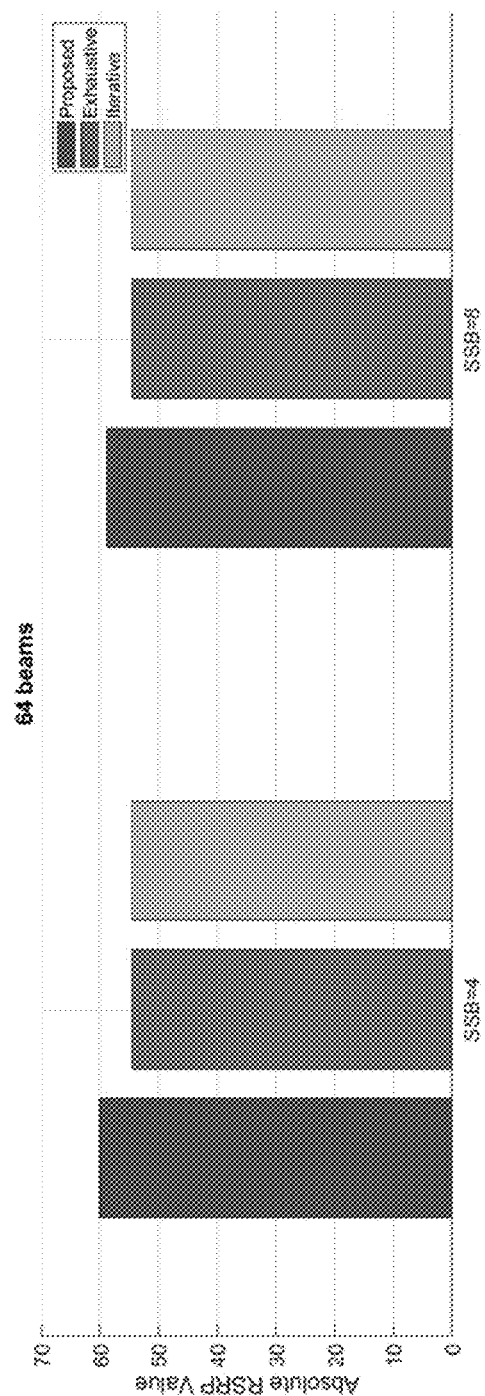
FIG. 17 presents the average RSRP considering a BS with 64 beams using 4 and 8 SSBs according to an embodiment of the present invention.

In FIG. 17, the example of application of the proposed embodiment using the RL algorithm CMAB (indicated in the legend as 'Proposed'), the Exhaustive Search ('Exhaustive'), and the Iterative Search ('Iterative') in terms of achieved absolute average RSRP considering a BS equipped with 64 beams with N={4, 8} SSBs. The proposed framework presents RSRP near to the optimal solution (Exhaustive Search). The UEs served by the BS configured with the proposed solution achieve approximately average 92% and 93% of the RSRP for a burst set of 4 SSBs and 8 SSBs, respectively. Therefore, FIGS. 16 and 17 show that there is a trade-off between the achieved average RSRP, and the number of bursts needed. The proposed framework achieves a near optimal signal quality link with a significantly reduced signaling overhead.

Figure 18:
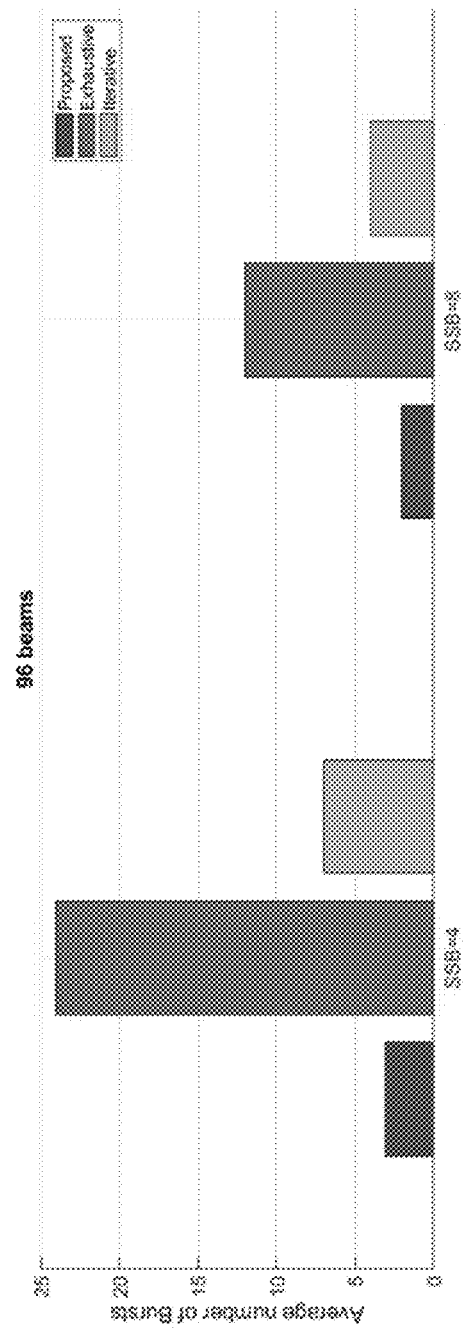
FIG. 18 presents the average number of SS bursts considering a BS with 96 beams using 4 and 8 SSBs according to an embodiment of the present invention.

In FIG. 18, the example of application of the proposed embodiment using the RL algorithm ('Proposed'), the Exhaustive Search ('Exhaustive'), and the Iterative Search ('Iterative') in terms of the number of SS bursts necessary to find the desired RSRP considering a BS equipped with 96 beams with two different numbers of SSBs 4 and 8. In a scenario with a higher number of beams, the UEs served by the BS configured with the proposed solution need in average 88% and 68% for exhaustive and iterative search less SS bursts to find a beam with the given RSRP considering N=4, respectively, and 83% and 50% for exhaustive and iterative search less SS bursts to find a beam with the given RSRP considering N=8, respectively.

Figure 19:
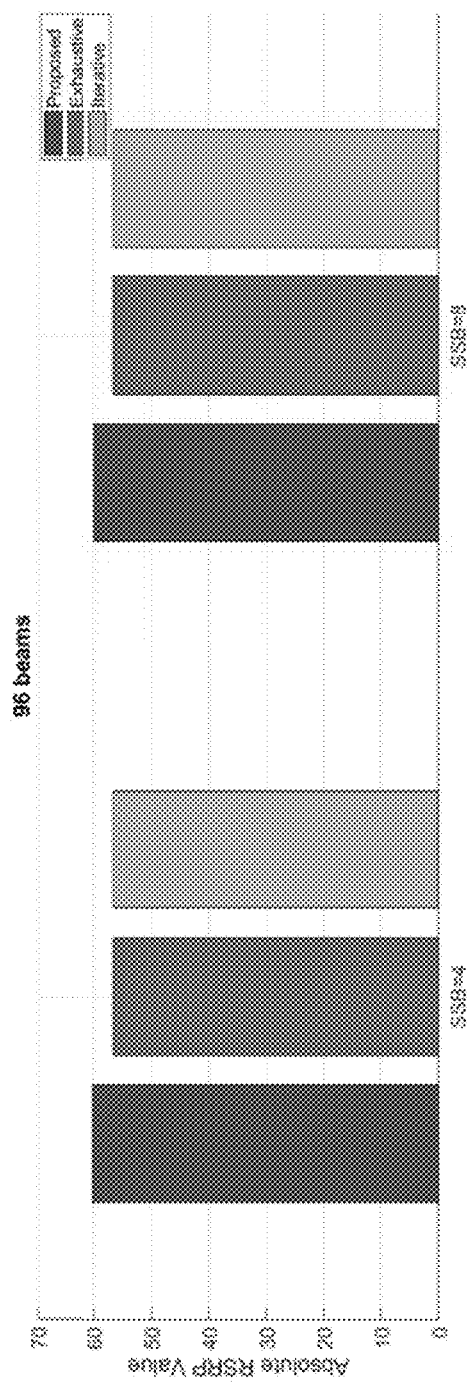
FIG. 19 presents the average RSRP considering a BS with 96 beams using 4 and 8 SSBs according to an embodiment of the present invention.

In FIG. 19, the example of application of the proposed embodiment using the RL algorithm ('Proposed'), the Exhaustive Search ('Exhaustive'), and the Iterative Search ('Iterative') are compared in terms of the number of SS bursts necessary to find the desired RSRP considering a BS equipped with M=96 beams with two different numbers of SSBs N={4, 8}. Focusing on the relative performance among algorithms, the UEs served by the BS configured with the proposed solution need in average 88% and 75% less SS bursts compared to for exhaustive and iterative search, respectively, to find a beam with the given RSRP, respectively, and 81% and 50% less SS bursts for exhaustive and iterative search to find a beam with the given RSRP. Therefore, FIGS. 18 and 19 confirm the trade-off between the achieved average RSRP and the number of bursts needed. Furthermore, the proposed framework successfully optimizes the selection of beams to transmit reference signals.

Although the present invention has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method of adaptively selecting beams in a network node implemented in a wireless communication system, comprising:
   determining, by the network node, a set of beams to transmit reference signals in a burst action set A={A #1, . . . , A #N} with N elements, where parameter N corresponds to a total number of the reference signals, wherein the determining is based on one of: random search, exhaustive search, iterative search and hierarchical search;
   transmitting, from the network node, a set of reference signals using the set of beams contained in A to an associated node;
   in response to the transmitting, receiving, from the associated node, measurements of a signal level of a radio link established between the network node and the associated node;
   calculating, by the network node, based on the measurements of the received signal level and a correlation between beams of the set of beams, an associated reward (R) cost function, which comprises a set of associated weights W={W1, . . . , WX}, where parameter X corresponds to a number of network parameters considered in the associated reward (R) cost function;
   updating, by the network node, a mapping of the burst action set A with the associated reward (R) cost function; and
   retransmitting, by the network node, the set of reference signals using an updated burst action set A', the updated burst action set A' being obtained based on the updated mapping, and wherein the set of beams in the updated burst action set A' is decorrelated beams.

2. The method as in claim 1, wherein the determining of the set of beams comprises considering measurements of signal levels and a quality indication.

3. The method as in claim 1, wherein the network node iteratively takes actions and measures impacts of the actions on the radio link based on the measurements of the signal level or a quality indication of the radio link.

4. The method as in claim 1, wherein the set of associated weights are updated, by the network node, according to network goals.

5. The method as in claim 1, wherein based on a negative impact being identified in network performance due to decisions taken by the network node, triggering a fallback to a predefined mechanism.

6. The method as in claim 5, wherein the network performance is based on measurements of signal levels or a quality indication.

7. The method as in claim 1, wherein a n-th element of the burst action set A is limited to a set of beams B={B #1, B #2, . . . , B #M}, determined according to an angular region to be covered in beam sweeping, where parameter M corresponds to a number of beams.

8. The method as in claim 7, wherein parameters N and M are predefined by the network.

9. The method as in claim 1, wherein the associated reward (R) cost function calculated by the network node is according to:

$$R = W_1 \cdot F_{UNCORRELATION}(A) + W_2 \cdot F_{KPI}(A)$$

where $W_1$ and $W_2$ are weight factors that determine impact of functions $F_{UNCORRELATION}$ and $F_{KPI}$, respectively, $F_{UNCORRELATION}(A)$ measures a relationship among a set of selected beams determined by the burst action set, and $F_{KPI}(A)$ indicates a measurement of signal level or a quality indication of a radio channel between the network node and the associated node, where:

$$F_{UNCORRELATION} = \frac{1}{F_{CORR}(A)};$$

$$F_{KPI}(A) = \frac{KPI\ (A)}{KPI_{TARGET}}.$$

10. The method as in claim 9, wherein a KPI is a channel quality indicator of the radio link between the network node and the associated node and $KPI_{TARGET}$ is a reference value of quality indication of a radio link defined for a network comprising the network node and the associated node according to requirements of provided services.

11. The method as in claim 1, wherein the associated reward (R) cost function calculated by the network node measures an impact of correlation among beams and the quality of a radio link between the network node and the associated node:

$$R = W_3 \cdot F_{CORR}(A, B_1^{TARGET}) - W_4 \cdot F_{CORR}(A, B_2^{TARGET})$$

where $W_3$ and $W_4$ are weight factors that determine the impact of a function $F_{CORR}$ on a value of the reward function; and $F_{CORR}$ is a correlation among a set of selected beams and a given beam B of interest; and $B_1^{TARGET}$ indicates the beam with an average measurement of signal level or quality indication equal to target value $T_1$ and $B_2^{TARGET}$ indicates the beam with the average measurement of signal level or quality indication equal to target value $T_2$.

12. The method as in claim 1, wherein the set of reference signals is a synchronization signal block.

13. The method as in claim 1, further comprising using, by the network node, a contextual multiarmed bandits (CMAB) approach, wherein the associated reward (R) cost function is:

$$R = R + \frac{RSRP}{T}$$

where T is a number of times that an action (A) was selected, and RSRP is a reference signal received power.

14. The method as in claim 13, wherein the contextual multi-armed bandits (CMAB) has two distinct phases: exploration phase with probability P and exploitation phase with probability 1−P.

15. The method as in claim 14, wherein in the exploration phase, a random action from the action (A) is selected.

16. The method as in claim 14, wherein in the exploitation phase a best action based on a mapping among action values and context information is selected.

\* \* \* \* \*